United States Patent [19]

Derenbecher, Jr.

[11] 4,009,487
[45] Feb. 22, 1977

[54] BLANKING GENERATOR FOR PAL SYNC SIGNALS

[75] Inventor: William Joseph Derenbecher, Jr., Cherry Hill, N.J.

[73] Assignee: RCA Corporation, New York, N.Y.

[22] Filed: Dec. 29, 1975

[21] Appl. No.: 645,184

[30] Foreign Application Priority Data

Apr. 4, 1975 United Kingdom .............. 13965/75

[52] U.S. Cl. ................................ 358/19; 358/150
[51] Int. Cl.² ......................................... H04N 9/46
[58] Field of Search ............. 178/69.5 G, 69.5 CB; 358/19, 17, 33

[56] References Cited

UNITED STATES PATENTS 3,627,913  12/1971  Ellis .............................. 178/69.5 G

FOREIGN PATENTS OR APPLICATIONS 2,248,105  4/1973  Germany .............................. 358/19

Primary Examiner—John C. Martin
Attorney, Agent, or Firm—Eugene M. Whitacre; Mason DeCamillis

[57] ABSTRACT

A single pre-vertical sync pulse that repeats once each field and the line-by-line chroma phase information which exists in the form of the PAL square wave at one-half of the horizontal line frequency are combined in a novel circuit comprising a pair of J-K flip-flops to directly produce the complete Bruch blanking function in digital form for each field on an independent field-by-field basis.

6 Claims, 3 Drawing Figures

BLANKING GENERATOR FOR PAL SYNC SIGNALS

BACKGROUND OF THE INVENTION

This invention relates to television synchronizing apparatus and especially to apparatus for producing the Bruch blanking waveform necessary in any PAL sync generating or regenerating apparatus.

The television broadcast systems of many countries and closed circuit operations utilize the PAL standards as defined by the CIRR standards, XII Plenary Assembly, 1970, Vol. V, Part 2, Report No. 407-1. These standards specify that the R-Y phase of chroma be inverted every television line. The burst signal on each line therefore alternates in phase between +135° and −135° from the B-Y reference. A further requirement of all PAL systems is that during the vertical interval when burst is suppressed, the first and last burst signals must be in the +135° phase. This latter requirement requires that the burst blanking signal must be staggered with respect to a vertical interval reference in any odd-line Pal system, such as the 525 or 625 lines-per-frame systems. This staggered burst signal blanking sequence, which is repeated once every four fields, is commonly referred to as the meandering burst blanking signal or in still shorter terms as Bruch blanking.

Signals in the form of pulses that repeat their cycle once per field are commonly available in any sync generating or regenerating circuitry, or they may be extracted from the vertical interval by well-known techniques and delayed to occur at any time with respect to the beginning of vertical sync. This known signal may be applied directly to a burst blanking circuit for an NTSC television system where the burst phase is the same for every line, and burst blanking is the same for every field. The burst blanking cycle for PAL systems, however, is more complex due to the unique four-field sequence utilized.

In known circuits, the necessary Bruch blanking sequence for a 625 line television system is developed in the following manner. A 625 line system requires a burst blanking interval of a duration of nine television lines (9H) with the position of this 9H blanking period to be staggered within successive fields. The burst blanking interval plus the burst pulse train must always comprise 2n lines because the burst phase alternation, as well as the PAL square wave switching signal for the R-Y and B-Y decoders, cannot be interrupted. Therefore, it follows that three of the four fields of a full cycle must contain an uninterrupted burst train of 303 lines duration and the fourth field requires a burst train of 304 lines. These unique burst trains, each beginning and ending with a different relationship to the known vertical interval sync pulse, are developed by extracting various pulses from the sync signal and utilizing them in numerical counting circuits. Typically, a first counter circuit actuated by the PAL square wave determines the stop of the 9H blanking interval, while a second counter counts the intermediate square wave cycles which have occurred since the end of the preceeding field. A suitable delay of the vertical sync interval pulse modifies the total burst train count to determine the start of the blanking period; for example, the second counter of 154 stages starts counting with a one-line delay in the second, third and fourth fields, but with a three-line delay in the first field, thus providing a total burst train sequence count of 2(154−3) + 1 = 303 lines in the second, third and fourth fields and 2(154−3) + 3 = 305 lines in the first fields. A commercially available form of the above-described circuitry is illustrated in the TR-70 video tape recorder manufactured by RCA Corporation, Camden, New Jersey, United States of America. In this apparatus, a 9H stop generator is gated from the horizontal line rate, and a counter circuit of 155 counts is modified for each field by a decoding circuit which combines vertical sync pulse with the vertical equalizing pulses of each field to provide the proper line count for each of the unique fields.

These known circuit arrangements, which employ high numerical counters and complex gating or decoding circuits, do not provide for flexibility of operation, particularly when equipment, such as video tape recorders and cameras, are required to operate between one or more standards, for example, PAL 625 to PAL 525 line standards. Such a change requires a reprogramming of the blanking interval, counter circuit and line count correcting circuitry. Since these known circuits depend on the counter and delay gating circuits having been set correctly during the previous vertical interval, interruptions of the television signal, such as may occur during a drop-out in a video tape recorder or signal fading in a video process, will result in a loss of proper blanking sequence. Similarly, when video tape recordings are edited and signals on a frame-to-frame basis are intermixed, extreme care is required to preserve or minimize the loss of the proper blanking sequence.

The present invention provides a unique means of providing Bruch blanking without the use of high numerical counters and complex gating circuitry. A single pre-vertical sync pulse that repeats once each field and the line-by-line chroma phase information which exists in the form of the PAL square wave at one-half of the horizontal line frequency are combined in a novel circuit comprising a pair of J-K flip-flops to directly produce the complete Bruch blanking function in digital form. The single pre-vertical pulse modified by line-to-line information contained in the PAL square wave provides the correctly phased Bruch blanking interval for each field on an independent field-by-field basis without depending on the previously mentioned counting circuits and gating delays having been set correctly during the previous vertical interval.

SUMMARY OF THE INVENTION

In accordance with the invention, a blanking generator for PAL television signals comprises: a first source of periodic signals at one-half the horizontal line rate having first and second polarity transitions and a source of periodic enabling signals related to the vertical field rate having a duration equal to a multiple of the horizontal line rate. First logic means responsive to the first signal source, are enabled by the enabling signal to provide a first output signal at the first polarity transition of the first signal to occur after application of the enabling signal, and second logic means responsive to the first signal source and the first output signal provide a second output signal from the second logic means at the second polarity transition occurring after the enabling signal duration. The second output signal being equal in time to the duration of the enabling signal, but displaced in time to be coincident with the first polarity transition of the first signal to occur after application of the enabling signal.

FIG. 2 illustrates the waveforms of the synchronizing signal, PAL square wave, and required Bruch blanking signal for each of the unique four fields of a 625 line PAL television system.

Figure 2:
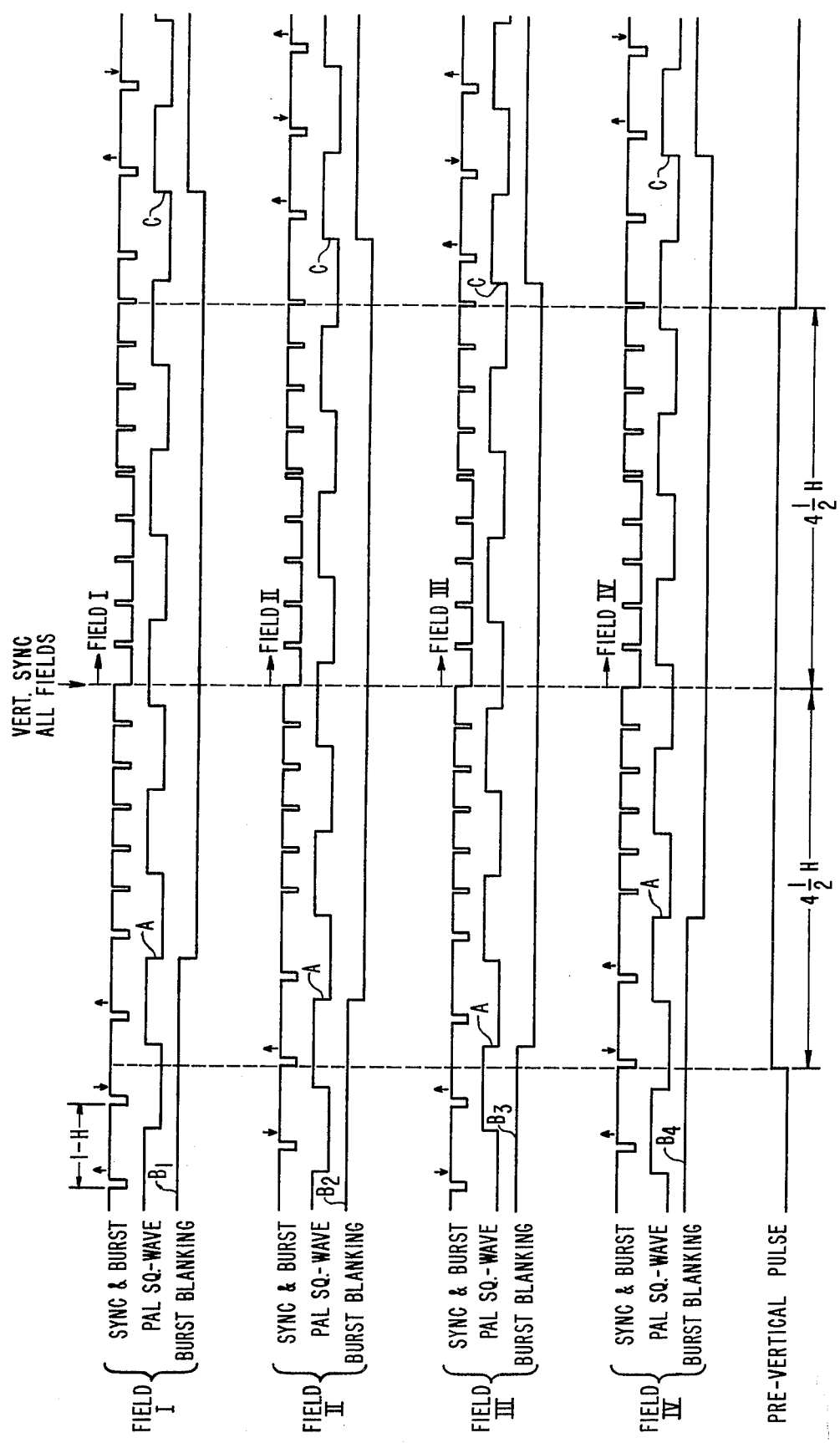
FIG. 2 illustrates waveforms depicting the operation of the circuit of FIG. 1 in conjunction with a PAL 625 line system.

The PAL square wave illustrated in FIG. 2 is positive during the time of bursts which are in the +135° phase and negative during the alternate bursts which are in the −135° phase. The positive and negative burst phase is indicated on the associated sync waveform for each field in the conventional manner by an upward pointing arrow for positive and a downward pointing arrow for negative. Additionally, the PAL square wave for each field is illustrated as changing state one-quarter of a horizontal period (1H) ahead of horizontal sync to allow additional tolerance in the relative timing between these waveform edges. This PAL square wave, which indicates the R-Y phase of the chroma signal for each television line, is basic to any PAL sync generating equipment and continues uninterrupted across the vertical interval where the bursts are eliminated. After the vertical interval, the bursts resume with their phase alternating in phase with the uninterrupted PAL square wave.

The waveform $B_1$, $B_2$, $B_3$, $B_4$, respectively, of each unique field labelled Bruch blanking illustrates the required blanking interval and its staggered or meandering position from field-to-field repeating only once in each four fields. The one edge of the PAL square wave that is coincident with the start of the required Bruch blanking in each field has been identified by the letter (A); similarly, the one edge per field that coincides with the end of Bruch blanking in each field has been identified by the letter (c).

Also illustrated in FIG. 2 is a pre-vertical pulse (E) of 9H duration which is positioned in a known manner to occur 4½ horizontal periods before vertical sync and 4½ horizontal periods after vertical sync.

Figure 1:
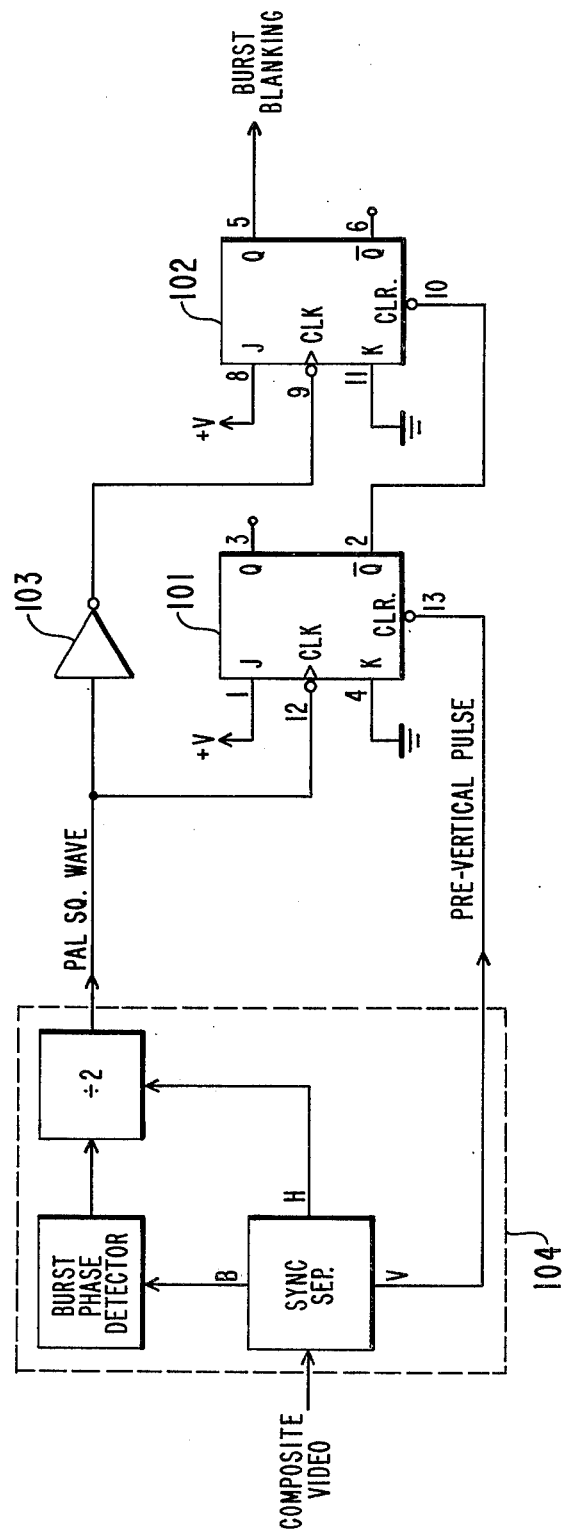
FIG. 1 is a block diagram of a Bruch blanking circuit according to the present invention.

Referring now to FIG. 1, there is illustrated, in block diagram form, an embodiment of the invention comprising a source of synchronizing signals 104, a pair of J-K flip-flops 101 and 102, and inverting amplifier 103 which directly produce the Bruch blanking signals (waveforms $B_1$, $B_2$, $B_3$, $B_4$ of FIG. 2) for the respective fields starting with the identified PAL square edge (A) preceeding the vertical interval and stopping with the identified PAL square edge (c) occurring after the vertical interval.

In FIG. 1, a composite video signal is coupled to the input terminal of a synchronizing signal source 104, wherein the horizontal, vertical and burst components of the composite video source are separated in a known manner. The horizontal component is offset by ¼H to provide edge tolerance as previously described by apparatus in the sync separator and coupled to a ÷2 circuit to produce a sync signal at one-half the horizontal frequency. The burst signal separated from the composite waveform is coupled to a burst phase detector which is in turn coupled to the ÷2 circuit to properly set the output of the divider. The separated vertical component is further delayed and timed by apparatus in the sync separator to provide an output pulse of 9H. The output of the ÷2 circuit and the vertical output pulse of synchronizing signal source 104 correspond to the previously mentioned PAL square wave and pre-vertical pulse of 9H duration. Alternatively, the PAL square wave and pre-vertical pulse may be obtained from corresponding portions of a synchronizing generator source which originates the composite synchronizing waveform. The pre-vertical pulse of 9H duration (waveform E of FIG. 2) is coupled to the clear input terminal of J-K flip-flop 101. The PAL square wave (waveforms $B_1$, $B_2$, $B_3$, $B_4$ of FIG. 2) is coupled to the clock input of J-K flip-flop 101. The PAL square wave is also coupled to an inverting amplifier 103 whose output terminal is coupled to the clock input terminal of J-K flip-flop 102. J-K flip-flops 101 and 102 have their respective J inputs coupled to a source of voltage (+V) which makes the J input high. The K input is coupled to a source of reference potential (gnd.) which makes the K input low. In a J-K flip-flop with J high and K low, a negative-going edge at the clock input, for example, the PAL square wave edge identified by A in FIG. 2, will cause the Q output of the J-K flip-flop to go high. Having been made high, the Q output will remain high regardless of the input clock waveform polarity until a low is applied to its clear input. The $\overline{Q}$ output will be the opposite phase of the Q output in this arrangement.

When the pre-vertical pulse is low, flip-flop 101 is cleared to keep the $\overline{Q}$ output high. This enables flip-flop 102 as it clear input is high corresponding to $\overline{Q}$. The negative-going edges of the clock signal (PAL square wave inverted by amplifier 103) maintain the Q output of flip-flop 102 in the high condition while the clear input of flip-flop 102 is high.

When the pre-vertical pulse applied to the clear input of flip-flop 101 goes high, it enables flip-flop 101, but the $\overline{Q}$ output of flip-flop 101 cannot change state until its clock input goes low, as shown by the PAL square wave edge identified as A. When this occurs, the $\overline{Q}$ output of flip-flop 101 goes low clearing flip-flop 102. This in turn causes the Q output of flip-flop 102 to go low corresponding to the PAL square wave edge marked A. This state is held until the pre-vertical pulse goes low and clears flip-flop 101.

When the pre-vertical pulse goes low, the $\overline{Q}$ output of flip-flop 101 goes high enabling flip-flop 102 which will now wait to change its Q output status (low) to a high until a negative clock edge is applied to the clock input of flip-flop 102. This negative clock input from inverter 103 coincides with the first positive waveform edge of the PAL square wave occurring after the blanking interval identified by the letter C. Thus, the Q output of 102, which provides the Bruch blanking signal, went low at the first negative-going edge of the PAL square wave after the pre-vertical pulse and maintained that status until the first positive-going edge after the 9H duration of the pre-vertical pulse, thereby developing the waveform identified as Bruch blanking signal (waveforms $B_1$, $B_2$, $B_3$, $B_4$, respectively, of FIG. 2) on a field-by-field basis. The uninterrupted clock waveform in the form of the PAL square wave alternations will have no affect on the output status of the Q output of flip-flop 102 until the pre-vertical pulse again goes high to recycle the J-K flip-flops 101 and 102 for the next Bruch blanking signal required for the next succeeding field.

Figure 3:
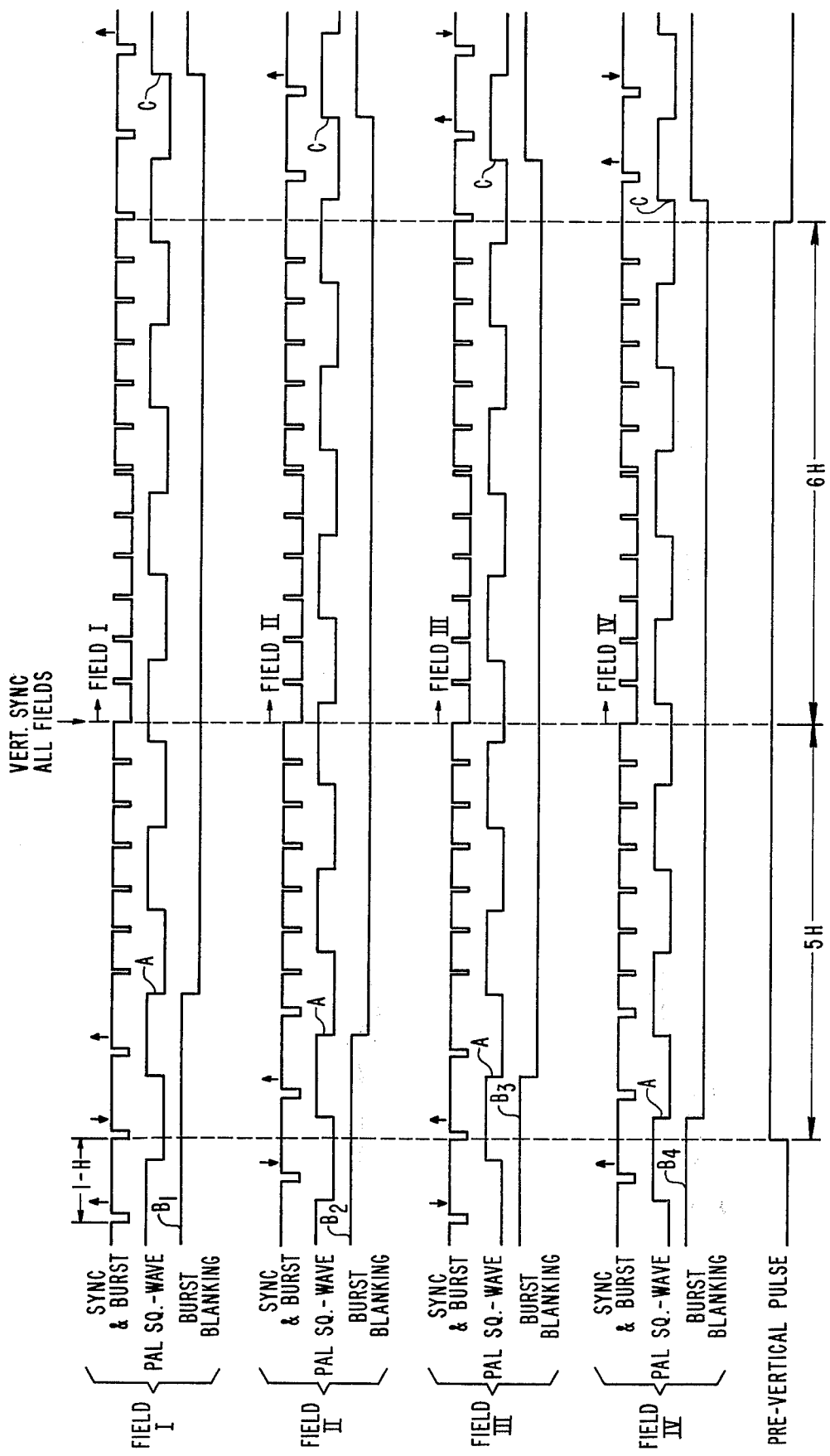
FIG. 3 illustrates waveforms depicting the operation of the circuit of FIG. 1 in conjunction with a PAL 525 line system.

FIG. 3 illustrates the desired waveforms for a PAL 525 line system. In FIG. 3, a pre-vertical pulse is provided with a duration of 11 horizontal lines beginning 5 horizontal periods before the vertical sync reference and ending 6 horizontal periods after the vertical sync reference. The duration of the pre-vertical pulse is thus arranged to be equal to the required burst blanking period. The 11 line period pre-vertical pulse and the PAL square wave are coupled to the apparatus of FIG. 1 which automatically provides the meandering burst blanking without circuit modification, thus making the apparatus of FIG. 1 particularly suitable for multiple-standards equipment.

What is claimed is:

1. A blanking generator for PAL television signals, comprising:
   a first source of periodic signals at one-half the horizontal line rate having first and second polarity transitions;
   a source of periodic enabling signals related to the vertical field rate having a duration equal to a multiple of said horizontal line rate;
   first logic means responsive to said first signal source, said first logic means being enabled by said enabling signal for providing a first output signal at the first polarity transition of said first signal to occur after application of said enabling signal;
   second logic means responsive to said first signal and said first output signal for providing a second output signal from said second logic means at the second polarity transition of said first signal occurring after said enabling signal duration;
   said second output signal being equal in time to the duration of said enabling signal, but displaced in time to be coincident with the first polarity transition of said first signal to occur after application of said enabling signal.

2. A blanking generator for PAL television signals according to claim 1 wherein said first and second logic means comprise J-K flip-flops.

3. A blanking generator according to claim 1 for a PAL television system of 625 horizontal lines wherein the duration of said periodic enabling signal is equal to nine horizontal lines.

4. A blanking generator according to claim 1 for a PAL television system of 525 horizontal lines wherein the duration of said periodic enabling signal is equal to eleven horizontal lines.

5. A blanking generator for PAL television signals comprising a first source of periodic signals at one-half the horizontal line rate having positive and negative transitions;
   a source of periodic enabling signals related to the vertical field rate having a duration equal to the desired blanking period;
   first flip-flop means responsive to said first signal source, said first flip-flop being enabled by said enabling signal for providing a first output signal at the first negative transition of said first signal to occur after application of said enabling signal;
   second flip-flop means responsive to said first signal source and said first output signal for providing a second output signal from said second flip-flop at the first positive transition of said first signal occurring after said enabling signal duration;
   said second output signal being equal in time to said desired blanking period, but displaced in time to start with the first negative transition of said first signal to occur after application of said enabling signal.

6. A blanking generator according to claim 5 wherein the first transition of said second output signal is coincident with the first negative transition of said first signal to occur after application of said enabling signal, and the second transition of said second output signal is coincident with the first positive transition of said first signal to occur after removal of said enabling signal.

* * * * *